Patented Aug. 12, 1952

2,606,886

UNITED STATES PATENT OFFICE 2,606,886

PROCESS FOR THE PRESERVATION OF A RUBBER WITH A TERPENE MODIFIED PHENOL

Lyle O. Amberg, Landenberg, Pa., assignor to Hercules Powder Company, Wilmington, Del., a corporation of Delaware No Drawing. Application October 16, 1948, Serial No. 55,027

2 Claims. (Cl. 260—45.95)

This invention relates to the art of natural and synthetic rubber compounding and more particularly to the production of rubber compositions which are characterized by resistance to oxidation.

It has long been known that the deterioration of rubber may be retarded by treating the rubber before or after vulcanization with substances variously known to the art as antioxidants, antioxygens, and age-resistors. However, the most effective of these substances known cause serious discoloration of light-colored rubber stocks and stain other materials which come into contact with the rubber so protected. For example, phenyl-$\beta$-naphthylamine (Agerite powder, Neozone D) cannot be used in the carcass of a white sidewall tire for the reason that it darkens the outer layer even though that layer contains a nondiscoloring antioxidant. The production of antioxidants which impart to rubber compounds superior resistance to aging yet exhibit no tendency to discolor light-colored materials has constituted a major problem in the art. By virtue of this invention, there is provided a group of most efficacious nondiscoloring and nonstaining rubber antioxidants.

Now in accordance with this invention, it has been found that the terpene-substituted phenols which may be formed by the condensation of a cyclic terpene having at least one ethylenic double bond with a phenol in the presence of catalysts such as boron trifluoride, anhydrous hydrogen fluoride and activated siliceous materials are surprisingly effective as rubber antioxidants. The product resulting from such a condensation is substantially entirely a terpene-substituted phenol which in some cases is a polyterpene-polyphenol. The terpenes which may be condensed with a phenol to produce these new rubber antioxidants include not only those compounds having the empirical formula $C_{10}H_{16}$ but also those compounds having the empirical formula $C_{10}H_{18}$ which are known as dihydroterpenes. The term "terpene" when encountered herein is to be understood as generic in this respect.

The process of this invention is practiced by treating natural or synthetic rubber with a terpene-substituted phenol which is prepared by reacting in the presence of a suitable catalyst such as boron trifluoride, a cyclic terpene and a phenol. This process constitutes a significant step forward in the rubber preservation art. Heretofore, the formulation of rubber compositions which were characterized by resistance to air oven and oxygen pressure aging required the utilization of antioxidants which stained or otherwise discolored light-colored rubber products. Conversely, light-colored rubber products which were not subject to such discoloration were of limited value against the effects of air oven or oxygen pressure aging for want of efficacious oxidation inhibitors. By virtue of the terpene-substituted phenols employed in accordance with the process of this invention, there may be provided rubber materials which demonstrate remarkable resistance to oxidation, yet are not subject to the discoloration which characterized similarly age-resistant prior art rubber compositions. Furthermore, rubber compositions prepared in accordance with the process of this invention do not stain other light-colored materials with which they come in contact.

The following examples are offered as specific embodiments of this invention. All parts and percentages are by weight unless otherwise specified.

EXAMPLE I

Terpene-substituted phenol and menthyl phenol were tested as antioxidants. The terpene-substituted phenol was prepared by adding with agitation over a period of 2.75 hours 37 parts of Solvenol to 60 parts of a 50% benzene solution of phenol which contained 2.12 parts of boron trifluoride catalyst. The reaction was carried out at a temperature of 25° C. in a glass-lined reaction vessel. The catalyst and unreacted phenol were removed from the crude reaction product by water washing at 55° C. and the unreacted Solvenol and the benzene solvent were removed by distillation at 145° C. followed by steam sparging as the temperature was raised to 173° C. The product so obtained was characterized by a hydroxyl content of 6.2% and a drop melting point of 85° C. The Solvenol referred to is a mixture of cyclic terpenes, a typical analysis of which is as follows: specific gravity, 0.8595/15.6° C.; refractive index, 1.4770/20° C.; distillation range, 177°–195° C.; $\alpha$-pinene, 12%; dipentene, 36%; $\alpha$-terpinene, 5%; p-menthane, 10%; terpinolene, 23%; p-cymene, 14%. The menthyl phenol was prepared in a similar manner by adding with agitation over a period of 5 hours, 750 parts of carvomenthene to 1000 parts of a 50% benzene solution of phenol which contained 35 parts of boron trifluoride catalyst. The reaction was carried out at a temperature of 25° C. in a glass-lined vessel. The product obtained was washed five times with hot water to remove the catalyst and unreacted phenol. The benzene solvent and the unreacted carvomenthene were removed by distillation in two continuous columns, the first maintained at atmospheric pressure and the second at a vacuum of 20 inches of mercury. The resultant product was characterized by a hydroxyl content of 7.2% and a color of 5 amber on the rosin scale. The carvomenthene employed was prepared by batchwise selective hydrogenation of commercial dipentene at 100° C. under a pressure of 75 p. s. i. in the presence of a Raney nickel catalyst. The bromine number of the carvomenthene so obtained was 80.

A sample of butadiene-styrene copolymer-type synthetic rubber (GR-S-10), short-stopped with sodium sulfide and containing no antioxidant, was coagulated and dried. The dried coagulate was then divided into three samples. Each of these samples was milled with 1.5 parts of the antioxidant to be tested per 100 parts of copolymer. The samples were then placed on a 6" x 12" standard rubber mill and premilled for 8 minutes. At the end of this period the following ingredients were added in the amount indicated and in the order listed.

| Ingredients | Parts |
|---|---|
| Synthetic Rubber | 250 |
| N-cyclohexyl-2-benzothiazole sulfenamide | 4.5 |
| Hydrogenated fish oil acids | 2.5 |
| Zinc Oxide | 12.5 |
| Asphalt | 25 |
| Carbon Black | 125 |
| Sulfur | 5 |

Each material was incorporated on a roll mill. When the addition of the sulfur was completed, the rubber was again thoroughly milled on the roll mill. After cooling for 2 hours the samples were tight rolled 6 times and sheeted off to fill 0.075 x 6 x 6" cavity molds. After standing overnight specimens of the test sheets were cured in a rubber mold at a temperature of 280° F. for periods of 60, 90, and 120 minutes, respectively. Eight tensile specimens (ASTM Die C) were cut from each sheet. Four were aged 24 hours at 100° C. in an air oven and permitted to stand overnight. They were then tested simultaneously with the 4 unaged specimens for tensile strength. The tensile strengths of the aged specimens were divided by the corresponding values for the unaged specimens and the quotient obtained multiplied by 100 to obtain the percentage retention of the original tensile strength after aging. The results from the 60-, 90-, and 120-minute cures were averaged and are reported in Table 1.

*Table 1*

| Antioxidant | Average Percent Retention of Tensile Strength |
|---|---|
| Menthyl phenol | 89 |
| Terpene-substituted phenol | 95 |
| Heptylated diphenylamine | 84.5 |

It is apparent from the above-tabulated results that the antioxidants with which this invention is concerned protect butadiene-styrene copolymer-type synthetic rubber compositions from heat embrittlement more effectively than does the prior art antioxidant tested.

EXAMPLE II

The following ingredients in the amounts indicated were compounded in accordance with ASTM procedure D-15-41. (This procedure is set forth in detail in ASTM Standards, 1946, part III-B, (1947).)

| Ingredients | Parts |
|---|---|
| Pale crepe rubber | 100.0 |
| Reogen (Mixture of oil-soluble sulfonic acids and paraffin oil) | 1.0 |
| Hydrogenated fish oil fatty acids | 2.0 |
| Zinc Oxide | 5.0 |
| Titanium dioxide | 25.0 |
| Calcium carbonate | 80.0 |
| Sulfur | 3.0 |
| Benzothiazyl disulfide | 1.5 |
| Ultramarine blue | 0.25 |

To aliquot portions of this master batch was added one part of the antioxidant to be tested per 100 parts of original crepe rubber. Phenyl-β-naphthylamine, hydroquinone monobenzyl ether, terpene-substituted phenol and menthyl phenol were tested as antioxidants. The terpene-substituted phenol and menthyl phenol were the same as that used in Example I. The antioxidants were thoroughly admixed with the rubber composition by milling. After standing overnight, the individual samples were cured 50 minutes at a temperature of 274° C. in 4.5 x 1 x 0.05" rubber molds. A control sample containing no antioxidant was also tested. After curing, approximately one-half of each sample was exposed to ultraviolet light on a Fadeometer for 18 hours while the other one-half was kept covered. As indicated in Table 2, the samples compounded with the terpene-substituted phenols of this invention demonstrated less discoloration than the samples containing no antioxidant while hydroquinone monobenzyl ether and phenyl-β-naphthylamine both caused increased discoloration. In fact there was substantially no discoloration of the terpene-substituted phenol treated samples.

*Table 2*

| Color Rating | Terpene-substituted Phenol | Menthyl Phenol | Hydroquinone Monobenzyl Ether | Phenyl-β-naphthylamine | No Antioxidant |
|---|---|---|---|---|---|
| (1 is best) | 1 | 1 | 3 | 4 | 2 |

EXAMPLE III

The following ingredients in the amounts indicated were compounded into a master batch in accordance with ASTM procedure D-15-41.

| Ingredients | Parts |
|---|---|
| Crude natural rubber smoked sheets (Mill blended to produce homogeneous stock) | 500.0 |
| Carbon Black | 250.0 |
| Zinc Oxide | 25.0 |
| Sulfur | 15.0 |
| Mercaptobenzothiazole | 3.75 |
| Hydrogenated fish oil acids | 20.0 |
| Saturated polymerized hydrocarbon | 20 |

The various antioxidants to be tested were milled into aliquot portions of this master batch. Hydroquinone monobenzyl ether, alkylated phenol sulfide, diisobutyl phenol, and terpene-substituted phenol were tested as antioxidants. The terpene-substituted phenol was the same as that used in Example I. One part of antioxidant per 100 parts of original cured rubber was employed in all instances except that of hydroquinone monobenzyl ether of which only 0.5 part per 100 parts of rubber was employed. From these samples 6 x 6 x 0.075" sheets were prepared and cured 50 minutes at 287° F. Four dumbbell specimens (ASTM Die C) were hung in a Bierer-Davis oxygen bomb under oxygen at a pressure of 300 lb./sq. in. The bomb was maintained at a temperature of 70° C. for a period of 72 hours. The specimens were then removed from the bomb and after standing overnight were tested for tensile strength and elongation simultaneously with untreated samples. The results of these tests are tabulated in Table 3 and demonstrated that terpene-substituted phenol provides protection from aging superior to that afforded by the prior art antioxidants tested.

Table 3

| Antioxidant | Percent Retention of Original Values After 72 Hours in Oxygen at 300 p. s. i. and 70°C. and curing at 287°F. for 50 Minutes | |
|---|---|---|
| | Tensile Strength | Elongation |
| Hydroquinone monobenzyl ether | 31 | 62 |
| Alkylated phenol sulfide | 30 | 61.5 |
| Terpene-substituted phenol | 35.5 | 71.5 |

EXAMPLE IV

Samples were prepared, cured, and tested in a manner identical with that described in Example III with the exception that the cured specimens were tested in a circulating air oven of the Geer-type for 3 weeks rather than in a Bierer-Davis oxygen bomb. The oven was maintained at a temperature of 70° C. Alkylated phenol sulfide and terpene-substituted phenol were tested as antioxidants. The terpene-substituted phenol was the same as that used in Example I. Specimens were prepared containing both one and two parts of each antioxidant per 100 parts of original rubber. The master batch was formulated from the following ingredients in the amounts indicated.

| Ingredients | Parts |
|---|---|
| Crude rubber smoked sheets (Mill blended to produce homogeneous stock) | 200 |
| Carbon black | 100 |
| Zinc oxide | 10 |
| Sulfur | 6 |
| Mercaptobenzothiazole | 1.5 |
| Hydrogenated fish oil acids | 8 |
| Saturated polymerized hydrocarbon | 8 |

The results of these tests appear in Table 4 and demonstrate that either 1 or 2 parts of terpene-substituted phenol per 100 parts of rubber inhibit increased modulus on air aging more effectively than does a like amount of the prior art antioxidant. At the same time the sample treated with the terpene-substituted phenol retained a greater part of its original elongation than did the alkylated phenol sulfide sample and exhibited equally as great a tensile strength at the end of the aging period.

Table 4

| Antioxidant Tested | Percent Retention of Original Properties After 3 weeks in Circulating Air Oven at 70° C. Average of 40-, 50-, 60-, and 80-Minute Cures at 287° C. | | |
|---|---|---|---|
| | Modulus at 200% Elongation | Tensile Strength | Elongation at Break |
| Alkylated phenol sulfide, 1 part per 100 parts rubber | 144 | 57 | 63 |
| Alkylated phenol sulfide, 2 parts per 100 parts rubber | 144 | 66 | 65 |
| Terpene-substituted phenol, 1 part per 100 parts rubber | 133 | 59 | 66 |
| Terpene-substituted phenol, 2 parts per 100 parts rubber | 136 | 65 | 70 |

EXAMPLE V

In this instance terpene-substituted cresol was employed. This material was prepared by adding with agitation 658 parts of a mixture of terpenes to 1096 parts of a 50% benzene solution of a mixture of meta- and para-cresol which contained 41.1 grams of boron trifluoride catalyst. The reaction was carried out at a temperature of 25° C. in a glass-lined vessel. The mixture of terpenes was added over a period of an hour and the agitation was continued for 3 additional hours. At the end of the 4 hour reaction period the crude product was washed 4 times with water at a temperature of 55° C. to remove the catalyst and unreacted cresol. The resultant material was then distilled at 20 mm. pressure. The mixture of terpenes employed contained 51% dipentene, 17% para-cymene, 15% para-menthane, 7% terpinolene, 5% α-terpinene and 5% of a mixture of α- and β-pinene.

The following ingredients in the amounts indicated were formulated into a cured rubber sample in accordance with ASTM procedure D-15-41. The sample prepared was high quality vulcanized rubber which demonstrated great resistance to deterioration by air and oxygen. Furthermore, this sample did not discolor or stain light-colored materials with which it came in contact.

Table 5

| Ingredients | Parts |
|---|---|
| Crude rubber smoked sheets, mill blended | 75 |
| Carbon black | 37.5 |
| Zinc oxide | 3.75 |
| Sulfur | 2.25 |
| Mercaptobenzothiazole | 0.5625 |
| Hydrogenated fish oil acids | 3 |
| Saturated polymerized hydrocarbon | 3 |
| Terpene-substituted cresol | 0.75 |

The preparation of the terpene-substituted phenols with which this invention is concerned has hereinbefore been described as being carried out in the presence of boron trifluoride as a catalyst. Actually, any reaction product of a terpene and a phenol which is substantially entirely a terpene-substituted phenol is operable in accordance with this invention. Such products result when catalysts other than boron trifluoride are employed, for example, anhydrous hydrogen fluoride, activated siliceous materials, etc. Exemplary of such activated siliceous materials are magnesium silicate, calcium silicate, synthetic aluminum silicates, silica gel, infusorial earths, fuller's earth, and Florida earth. Likewise, commercial acid-treated montmorillonite-type minerals such as those sold under the trade names Percol, Filtrol, and Super Filtrol may be employed. If desired, these catalysts may be calcined at temperatures of about 200–400° C. prior to use. These catalysts may be used in the form of powders, granules, and pellets. The condensation of the terpene with the phenol in the presence of these catalysts may be carried out in substantially the same manner as that hereinafter described for condensation in the presence of boron trifluoride catalyst.

Certain other catalysts, however, such as aluminum chloride, zinc chloride, stannic chloride, inorganic acids such as sulfuric acid, phosphoric acid, hydrogen chloride and organic sulfonic acids such as p-toluenesulfonic acid do not produce reaction products which are substantially entirely terpene-substituted phenols. Such catalysts form condensates of a terpene and a phenol which contain large quantities of terpene phenyl ethers, whereas the use of boron trifluoride, anhydrous hydrogen fluoride or activated siliceous materials results in condensates which are substantially entirely terpene-substituted phenols.

Phenols which may be employed in the present invention, using any terpene and using the conditions of temperature and time hereinbefore set forth, are any chemical substance having a phenolic characteristic, as for example, phenol, tar acids, cresols, xylenols, alkyl-, aralkyl-, and aryl-substituted phenols such as p-tertiary butyl phenol, p-tertiary amyl phenol, p-phenyl phenol, ortho- and para-cyclohexyl phenol, monochloro phenols, nitro phenols, naphthols, dihydroxy benzenes such as pyrocatechol and resorcinol, dihydroxy naphthalenes, dihydroxy anthracenes, dihydroxy diphenyls, 2,2-bis(p-hydroxyphenyl) propane, and alkoxy phenols such as guaiacol, etc.

Generally, cyclic terpene hydrocarbons having at least one ethylenic double bond are useful in accordance with this invention. The terpene hydrocarbons may be conveniently referred to as those cyclic terpene hydrocarbons having an empirical formula of $C_{10}H_{16}$ or $C_{10}H_{18}$. Suitable monocyclic terpenes are dipentene, terpinolene, α-terpinene, β-terpinene, gamma-terpinene, α-phellandrene, β-phellandrene, limonene, critmene, 2,4(8)-menthadiene, 2,4(5)-menthadiene, 2,5-menthadiene, 3,8-menthadiene and 2,8-menthadiene. The bicyclic terpenes containing one double bond which readily isomerize to terpenes containing two double bonds are also operable in accordance with this invention and typical examples are α-pinene, β-pinene, carenes, and thujenes. Bicyclic terpenes containing one double bond such as camphene, bornylene, α-fenchene, β-fenchene, gamma-fenchene, etc., which do not isomerize to monocyclic terpenes containing two double bonds may be used in which case the product is a bornyl-, isobornyl-, etc., substituted phenol. Mixtures of the various cyclic terpenes may also be used.

Any monocyclic dihydroterpene having the formula $C_{10}H_{18}$ and at least one ethylenic double bond may also be utilized. Suitable monocyclic dihydroterpenes having an empirical formula of $C_{10}H_{18}$ are the para-menthenes, such as 1-para-menthene (carvomenthene) 2-para-menthene, 3-para-menthene, 1(7)-para-menthene, 4(8)-para-menthene and 8-para-menthene, as well as dihydropyronenes.

When methenes are prepared by the hydrogenation of the exocyclic double bond in substantially pure dipentene, it is desirable that this hydrogenation be carried out to the extent of about 105% to about 110% of one double bond in order to obtain the most desirable results. The resulting product will contain about 80% to about 90% of the desired menthene.

The para-menthene-type of dihydroterpenes may be conveniently produced by hydrogenating a para-menthadiene such as dipentene in a suitable closed system using a hydrogen pressure of about 25 to about 2000 lb./sq. in. and temperatures between about 25° C. and about 200° C. in the presence of a suitable hydrogenation catalyst. They may also be obtained by the dehydration of dihydroterpineols.

Monocyclic dihydroterpenes containing one double bond formed by means of liquid or vapor phase thermal isomerization of dihydropinene (pinane) are also operable.

The condensation reaction between the cyclic terpene and the phenol is preferably carried out by absorbing a suitable catalyst such as gaseous boron trifluoride in the phenol to be reacted with the terpene, desirably in the presence of an inert solvent, in order to reduce the viscosity of the reaction mixture, after which the terpene is added during a suitable period with agitation, while controlling the temperature by external means, and while controlling the rate of addition of terpene. After adding the terpene, the homogeneous mixture is agitated for another suitable period of time to complete the reaction between the terpene and the phenol. The catalyst is then removed by water-washing, or by other means, and the reaction mixture is subjected to steam and/or vacuum distillation in order to remove the solvent and unreacted constituents, leaving the terpene-substituted phenol as a residue.

If desired, the terpene and phenol to be reacted may be mixed together, desirably in the presence of an inert solvent, and then the boron trifluoride or other suitable catalyst introduced into the mixture. However, this procedure is less desirable than when the terpene is added to the catalyst treated phenol as previously described, since it is more difficult to control the temperature of the reaction when the boron trifluoride is added to the terpene-phenol mixture.

In carrying out the condensation reaction between a cyclic terpene and a phenol to form the terpene-substituted phenols, it is usually desirable to employ at least one mole of phenol for each mole of cyclic terpene. However, an excess of either terpene or phenol may be used; preferably about 0.75 to about 2 moles of phenol are used for each mole of terpene.

The reaction temperature that may be employed in reacting a cyclic terpene with a phenol to form the terpene-substituted phenol may range from about −10° C. to about 150° C., and the temperature range is preferably from about 5° C. to about 70° C. The reaction period may range from about 0.5 to about 24 hours and is preferably from about 1 hour to about 8 hours.

The catalyst is desirably removed from the reaction mixture by washing the reaction mixture with water at a temperature desirably between about 20° C. and about 100° C. The use of water at an elevated temperature favors the decomposition of the boron trifluoride reaction complex formed when boron trifluoride is employed as a catalyst, and hence facilitates the removal of boron trifluoride.

The quantity of catalyst that may be used in catalyzing the reaction between the cyclic terpene and the phenol to produce the terpene-substituted phenols of this invention may vary from about 0.2% to about 25% of the weight of the reaction mixture and preferably from about 1% to about 6%. The reaction mixture includes the solvents used as well as the terpene and the phenol components.

Substantially inert solvents, such as benzene, toluene, xylene, cyclohexane, para-menthane, para-cymene, carbon tetrachloride, ethylene dichloride, etc., may be used during the condensation reaction in order to reduce the viscosity of the reaction mixture and facilitate satisfactory mixing of the components.

After the condensation has been completed between the cyclic terpene and phenol, and the catalyst has been removed, the resulting mixture may be subjected to steam and/or vacuum distillation in order to remove small amounts of unreacted materials and solvents.

If desired, the condensate which remains after removal of solvent and unreacted constituents can be further distilled at pressures of 30 mm., or less, whereby the volatile terpene-substituted phenols are removed. For example, in general the condensates from both bicyclic terpenes of the formula $C_{10}H_{16}$ which readily isomerize to monocyclic terpenes and monocyclic terpenes of the formula $C_{10}H_{16}$ can be subjected to low pressure distillation which will remove part of the volatile liquid terpene-substituted phenols and increase the concentration of solid non-volatile polyterpene polyphenols in the residue.

The condensates from bicyclic terpenes of the formula $C_{10}H_{16}$ which do not isomerize to monocyclic terpenes can also be subjected to distillation to remove volatile terpene-substituted phenols and obtain a solid residue which usually consists of polyterpene phenols. For example, the condensate of camphene and phenol can be separated by distillation into a volatile liquid, monoisobornyl phenol, and a solid nonvolatile product which is substantially a diisobornyl phenol.

In the case of $C_{10}H_{18}$ terpenes having at least one ethylenic bond, the substituted phenols of the present invention may be subjected to vacuum distillation, preferably at a pressure of 0.1 to about 10 mm., for purposes of purification. For example, menthylphenol and also the menthylcresols are sufficiently volatile to permit their purification by means of vacuum distillation. Dimenthylphenol and dimenthylcresol are less volatile. Some of the higher menthyl-substituted phenols are nonvolatile. In the case of the non-volatile menthylphenols, they may be refined in solution using such solvents as benzene, toluene, etc., with adsorbents such as fuller's earth, bauxite, activated carbon, natural and synthetic magnesium silicates, etc., in high yield.

Crystalline dihydroterpene-substituted phenols may also be purified by recrystallization from a suitable solvent such as alcohol, acetone, ethyl acetate, hexane, etc.

The terpene-substituted phenols which are obtained from the $C_{10}H_{18}$ terpenes having at least one ethylenic double bond range in color from about D to about X on the Rosin color scale. The products, which are dark in color, may be refined in solution, using such solvents as benzene and toluene, with adsorbents such as fuller's earth, bauxite, activated carbon, natural and synthetic magnesium silicates to produce high yields of resinous product, having a much lighter color. The efficiency of the adsorbents is improved by calcination of them at temperatures of 200° C. to 500° C. prior to their use.

The antioxidants with which this invention is concerned are equally advantageous whether compounded with natural or synthetic rubber material. Accordingly, natural rubber, butadiene-styrene and butadiene-acrylonitrile copolymer-type synthetic rubbers, polychlorobutadiene, polyethylene-polysulfide copolymer, isobutylene-diolefin copolymer and other natural and synthetic rubber materials are equivalently operable in this invention. Various types of rubber or vulcanizable rubberlike material may be utilized. However, in most instances, pale crepe or first grade smoked sheets of natural rubber, butadiene copolymer composition or isobutylene-butadiene copolymer, or high grade reclaimed natural or synthetic rubber is preferred.

The antioxidants with which this invention is concerned may be employed in amounts of from about 0.1 to about 10% of the weight of the rubber material treated. The preferable range of concentration of the antioxidant depends upon the type of rubber in question and the other compounding ingredients it is desired to employ. In general, it is preferred to use an amount equivalent to from about 0.25% to about 7.5% of the weight of the untreated rubber.

The terpene-substituted phenols are preferably incorporated into the rubber by milling or by a similar process prior to vulcanization. However, they may be added to the rubber latex before its coagulation or applied to the surface of a mass of crude or vulcanized rubber. The term "treating" as used herein and in the claims is to be understood as generic in this sense.

The customary fillers, vulcanizers, accelerators, and other processing aids may be utilized with the terpene-substituted phenols employed in accordance with this invention. The proper proportions and types of these various ingredients are dependent upon the type of rubber to be treated and the properties it is desired to incorporate into the final vulcanized product and are well known to those skilled in the art.

As fillers there may be employed, for example, aluminum flake, antimony sulfide, asbestine, asbestos, barium sulfate, cadmium sulfide, any of the various grades of carbon black, chromic oxide, clay, cotton linters, iron oxide, quick limes, slaked lime, litharge, lithopone, magnesium carbonate, magnesium oxide, mica, silica, slate flour, talc, titanium dioxide, ultramarine, vermilion, whiting, zinc oxide or zinc sulfide. Preferably a mixture of these materials is employed to give the rubber or synthetic rubber compositions the desired color and other properties. For example, compositions containing any of the various types of natural rubber or synthetic rubber may contain both zinc oxide and carbon black as filling ingredients.

As a vulcanizing agent, sulfur is preferred, but in some cases selenium or tellurium may be desirable or may be used in conjunction with sulfur. Other vulcanizing agents, such as a peroxide may be used.

The accelerators which are employed for the purpose of increasing the rate of vulcanization and to permit vulcanization at lower temperatures are, for example, diphenylamine, di-o-tolylguanidine, diphenylguanidine, ethylidine aniline, hexamethylene tetramine, mercaptobenzothiazole, methylene aniline, tetramethylthiuram disulfide, tetramethylthiuram monosulfide, triethyltrimethylenetriamine, thiocarbanilide, triphenylguanidine. All of these compounds and others known to the art may be employed in conjunction with the antioxidants of this invention. Thus, the various reinforcing agents, extenders, plasticizers, softeners, activators, antioxidants, and the like may be so used.

By virtue of this invention, there may be prepared natural and synthetic rubber compositions which are characterized by marked resistance to oxidation. Furthermore, light-colored or white rubber compositions formulated in accordance with this invention demonstrate substantially no discoloration after continued exposure to ultraviolet light. In addition, rubber compositions prepared with these new antioxidants do not stain other light-colored materials with which they come in contact.

What I claim and desire to protect by Letters Patent is:

1. The method of preserving a conjugate diolefin polymer which comprises vulcanizing the conjugate diolefin polymer in the presence of a terpene-substituted phenol prepared by condensing in the presence of boron trifluoride, a hydrocarbon phenol with a mixture of cyclic terpenes characterized by the following physical properties and percentage composition: specific gravity, 0.8595/15.6° C.; refractive index, 1.4770/20° C.; distillation range, 177-195° C.; α-pinene, 12%; dipentene, 36%; α-terpinene, 5%; p-menthane, 10%; terpinolene, 23%; p-cymene, 14%.

2. The method of preserving a conjugate diolefin polymer which comprises vulcanizing the conjugate diolefin polymer in the presence of a terpene-substituted phenol which is prepared by condensing in the presence of boron trifluoride, phenol with a mixture of cyclic terpenes characterized by the following physical characteristics and percentage composition: specific gravity, 0.8595/15.6° C.; refractive index, 1.4770/20° C.; distillation range, 177-195° C.; α-pinene, 12%; dipentene, 36%; α-terpinene, 5%; p-menthane, 10%; terpinolene, 23%; p-cymene, 14%.

LYLE O. AMBERG.

REFERENCES CITED

The following references are of record in the file of this patent:

UNITED STATES PATENTS

| Number | Name | Date |
| --- | --- | --- |
| 1,991,999 | Barbury et al. | Feb. 19, 1935 |
| 2,052,860 | Wilson | Sept. 1, 1936 |
| 2,123,898 | Honel | July 19, 1938 |
| 2,129,153 | Schirm | Sept. 6, 1938 |
| 2,320,746 | Paul | June 1, 1943 |
| 2,429,603 | Borglin et al. | Oct. 28, 1947 |
| 2,429,858 | Vincent | Oct. 28, 1947 |
| 2,537,636 | Kitchen | Jan. 9, 1951 |